United States Patent Office 3,526,089
Patented Sept. 1, 1970

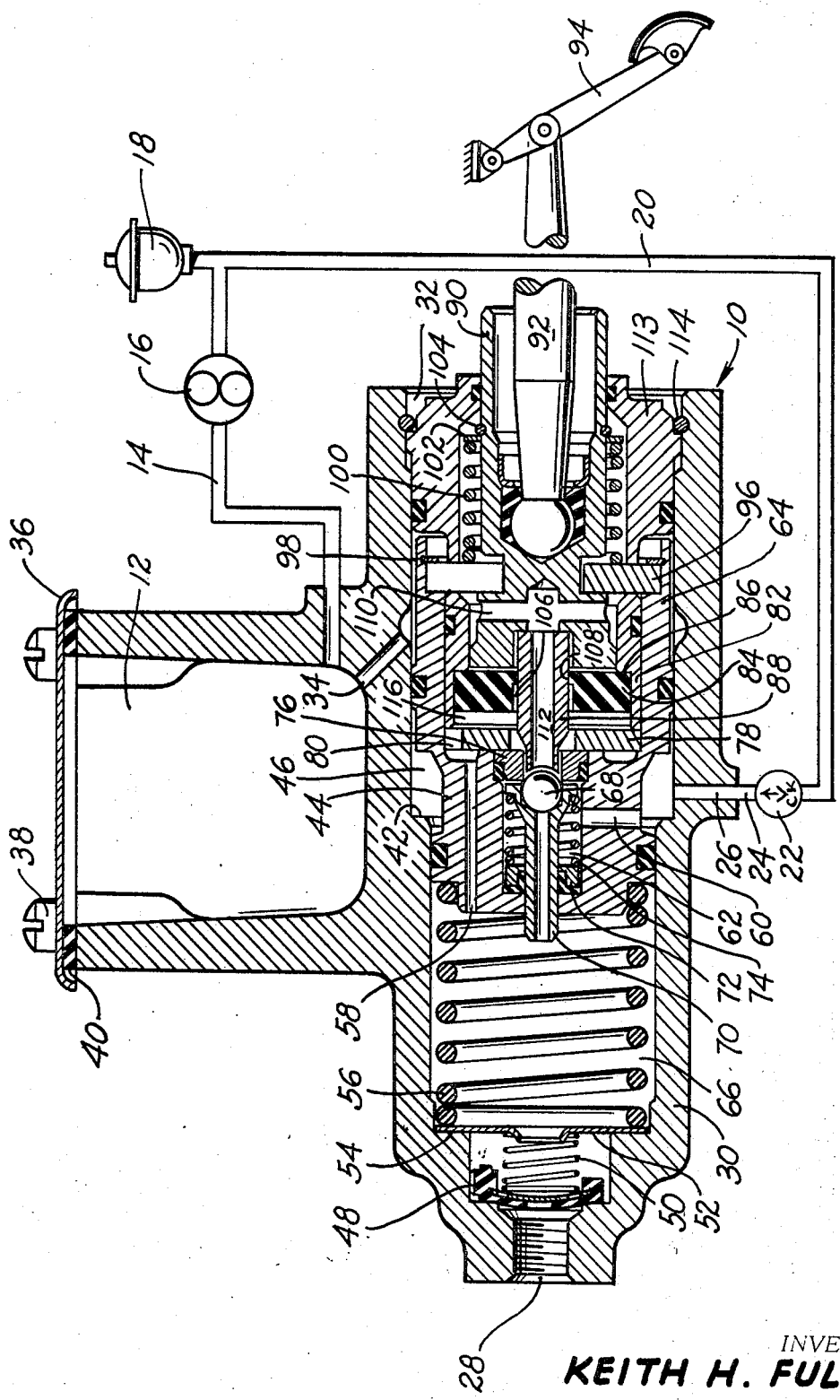

3,526,089
REACTION MEANS FOR FLUID PRESSURE CONTROL VALVE
Keith H. Fulmer, South Bend, Ind., assignor to The Bendix Corporation
Continuation of application Ser. No. 678,830, Oct. 30, 1967. This application Dec. 18, 1968, Ser. No. 797,306
Int. Cl. F15b *13/14, 15/18*
U.S. Cl. 60—54.5                12 Claims

ABSTRACT OF THE DISCLOSURE

A reaction means for a control valve between the pressure generating chamber and a reservoir communication in a control chamber which provides a limited area friction seal for an actuating member of the control valve that also permits self-aligning of the valve elements.

---

This application is a continuation of Ser. No. 678,830, filed Oct. 30, 1967, and now abandoned.

SUMMARY

In modern day automobile vehicles with the effective braking pressure requirements of the drum and/or disc brake increasing, it is desired to have the size of the unit supplying the pressure remain relatively constant. This has introduced a need for a brake actuator delivering high pressure with unlimited fluid displacement. Those skilled in the art to which this invention relates have devised full power hydraulic systems which have eliminated space problems and provide high output pressure with unlimited displacement. Such systems may be readily seen with reference to U.S. Pat. No. 3,283,505 issued Nov. 8, 1966 and assigned to the common assignee of this application.

The principal object of this invention is to improve upon devices such as mentioned within the prior art by providing a reaction device which not only seals the control chamber for such prior art devices, but permits freer operation of the valve elements and self-aligning of the valve elements, which features are not suggested in the prior art.

DRAWING DESCRIPTION

The single sheet of drawings shows a hydraulic control valve in cross section incorporating the principles of this invention and schematically connected in a pressure circuit to show one form of utility for the inventon.

DETAILED DESCRIPTION

With more particular reference to the figure, there is shown a hydraulic power system comprised of a control valve 10 provided with a fluid reservoir 12 connected by a conduit 14 to a pump 16 delivering pressurized fluid via an accumulator 18 and conduit 20 to a check valve 22 connected by a conduit 24 to the control valve inlet port 26.

Considering the invention applicable to power brake systems, as mentioned above, it should be noted that the pump 16 may be a variable displacement type or a constant displacement type with a by-pass provision depending upon the preference of the vehicle manufacturer. In any event, the pump delivers fluid pressure on the order of 1700 to 188 p.s.i. for such systems to provide adequate pressure from the control valve discharge port 28.

As will also be recognized by those skilled in the art that the pump 16 will be preferably connected to the vehicle's engine by a pulley and belt arrangement (not shown) such as the engine's fan belt.

Referring now more particularly to the control valve construction, it is shown to be preferably constructed from a solid housing 30 provided with the reservoir cavity 12 and an axial bore 32 connected by means of a passage 34 to the reservoir cavity 12. The reservoir cavity 12 is closed by means of a cover 36 joined to the housing 30 by bolts 38 with a seal 40 interposed. The bore 32 is preferably of stepped design to provide a shoulder 42 facing the open end of the bore and a piston 44 of stepped design is inserted into the bore 32 such that an inlet chamber 46 is created between the shoulder 42 and a larger face of the piston 44 into which the inlet port 26 opens. Prior to the assembly of the piston 44 into the bore 32 a residual pressure check valve 48 is fitted over the outlet port 28 of the housing 30 and biased thereagainst by a spring 50 between a plate 52 and the valve 48. The plate 52 is held against another shoulder 54 of the bore 32 behind the outlet port 28 by means of a return spring 56 which is fitted to the forward face of the piston 44.

The piston 44 is formed to have an axial passage 58, a radial passage 60, a valve chamber 62 and a hollowed skirt 64. As seen, the axial passage 58 communicates chamber 66 between the residual valve 48 and the forward face of the piston 44 to the hollowed skirt 64; and the radial passage 60 communicates the inlet chamber 46 to the valve chamber 62 of the piston. Within the valve chamber 62 a ball 68 is press fitted to a tubular stem 70 that projects beyond the forward face of the piston 44 through an opening thereof that is sealed, as by a Teflon seal 72 which is held in place by means of a retainer for a valve spring 74 biasing the ball 68 toward the hollowed skirt 64. The valve chamber is closed by means of a press fitted valve seat and seal assembly 76 which limits the movement of the ball 68 aforementioned.

An actuator sub-assembly is then joined with the piston assembly prior to its insertion in the bore 32 which comprises an annular plate 78 having notches 80, a disc retainer 82 for a rubber disc 84 that is press fitted within the retainer 82 to abut against a shoulder 86 thereof, a valve plunger 88 abuttingly connected to a movable member 90 joined by a push rod 92 to a brake pedal 94. A C-washer 96 and retainer ring 98 unites these parts within the hollowed skirt 64 of the piston 44, and a spring 100 between the C-washer 96 and a plate 102 held by retaining ring 104 to the member 90.

It should be noted that the disc 84 is relieved as at 106 to provide a limited area sealing lip 108 supporting the plunger 88 radially in that the abutting connection of the plunger 88 to the member 90 is by means of bearing within a counterbored hole in the member 90 connected to radial passages 110 so that passage 112 within the plunger 88 is opened to the rear face of the piston 44 and consequently to the return passage 34 leading from the bore 32 to the reservoir 12.

The piston assembly is then ready for insertion into the bore 32 and thereafter a collar 113 is fitted within the open end of the bore until a retainer ring 114 may be positioned in a recess of a housing 30 to close the bore 32.

It should be understood without particular reference thereto that the seals shown in the drawing provide the appropriate integrity of the various chambers in the control valve assembly.

OPERATION

As the brake pedal 94 is moved to the left, as viewed in the drawing, the plunger 88 is moved inwardly of the piston 44 to seek a seat on the ball 68. The limited area of the sealing lip 108 for the disc 84 permits radial movement of the plunger 88 to prevent lateral forces which may be in the plunger 90 from effecting the seating of the plunger 88 and the ball 68. Furthermore, the limited area of this lip 108 will also decrease the frictional forces acting upon the movement of the plunger 88 within the disc 84. It should be understood that in this initial movement the spring 100 is being compressed to provide a small degree of feel force to the operator of the pedal 94.

As further movement of the pedal 94 takes place, the ball 68 will be removed from the seat 76 so that the hydraulic pressure within the valve chamber 62 will be ported about the plunger 88 to control chamber 116 that is open by means of notches 80 and passage 58 to chamber 66. Thus, the hydraulic pressure will be directed from the control valve 10 to brake actuators or the like that is to be controlled by the valve. Again reference is particularly made to the fact that as the pressure is ported from the valve chamber 62 to the control chamber 116 it will react upon the disc 84 to bulge it rearwardly to provide a feel force on the face of the member 90. This feel force will be proportioned in that the outer periphery of the disc 84 is also abutting shoulder 86 of the disc retainer 82 which by way of the C-washer 96 and the collar 113 is directed to the housing 30 of the valve 10. Due to the recessed portion 106 of the disc 84, the pressure will not react except by means of the limited area of the lip 108 on the plunger 88 so that pressure forces will not greatly interfere with the modulation of the valve 10 thereafter.

Upon release of the pedal 94 the springs 74 and 100 come into play in again seating the ball 68 on the seat 76 of the piston and removing the plunger 88 from the ball so that the chamber 66 is communicated by way of passages 112, 110 and 34 to the reservoir chamber 12 and the pressure may be returned from the actuators connected to the port 28 after the residual valve 48 is unseated by the pressure differential thereacross.

Having described an operative construction of this invention it is now desired to set forth the intended protection sought by these Letters Patent in the appended claims.

I claim:

1. For use with a control means having a valve mechanism adapted to control delivery of fluid pressure, a reaction and seal means between the valve mechanism and an oprator-operated control element for same, said reaction and seal means comprising:
   a disc retainer operatively related to a housing for the valve mechanism and the operator-operated element to slidably support said operator-operated element; and
   a confined flowable medium in the form of an annular disc press fitted within said disc retainer and having a stepped inner opening to provide a sealing lip of limited area operatively related with a projection from said operator-operated element to slidably support same while permitting radial alignment of the projection with a valve element normally closing a source of fluid supply from a discharge port of said housing.

2. A control mechanism having a regulating means controlling a pressure source and reaction means to provide a feel of operation in the supply of pressure by said regulating means, said reaction means comprising:
   a housing; and
   a deformable member sealing a control chamber of said control mechanism about a sliding plunger, said deformable member being mounted within the housing and having a recessed lip sealingly engaging the plunger to provide a lesser area of contact with said plunger than the total cross sectional area of said deformable member so that friction forces are minimized between said deformable member and said plunger as they move relative to one another and said plunger is self-aligning.

3. A control assembly for a brake system having a housing with a cylindrical bore:
   a chamber within said bore between a pressure source inlet, a pressure discharge port and a return port for the control assembly;
   valve means axially mounted within said chamber and normally preventing communication of said fluid pressure source inlet from said discharge port and said return port; and
   actuating means adapted to move said valve means to control fluid flow from said source to said discharge port while closing said return port from said discharge port and to convey feel of operation as well as seal communication of said chamber from said return port to said control assembly, said actuating means being supported within said control assembly and having an annular deformable member sealing the assembly of the actuating means with a seal surface for the actuating means of lesser area than its seal surface with the assembly such that relative motion between the actuating means and the deformable member is not retarded by friction.

4. A control assembly according to claim 3 wherein said deformable member is an annular rubber disc having a stepped central opening to provide a limited area sealing surface within which said actuating means is relatively movable axially and laterally.

5. For use with a control means having a piston valve mechanism adapted to control delivery of fluid pressure and in the absence of fluid pressure to pressurize a trapped fluid, a reaction and seal means between the piston mechanism and an operator-operated control element for said piston valve mechanism, said reaction and seal means comprising:
   a disc retainer operatively related to a housing for the piston valve mechanism and the operator-operated element to slidably support said operator-operated element; and
   a confined flowable medium in the form of an annular disc press fitted within said disc retainer and having a stepped inner opening to provide a sealing lip of limited area operatively related with a projection from said operator-operated element to slidably support same while permitting radial alignment of the projection with a valve element of said piston valve mechanism.

6. A control mechanism having a manually operable piston means adapted to function in the absence of a pressure source with a valve means controlling said pressure source and reaction means to provide feel of operation in the manual operation of the piston and the supply of pressure by said valve means, said reaction means comprising:
   a disc retainer having a stepped opening therethrough operatively connected to a housing of a control mechanism; and
   a deformable member sealing a control chamber of said control mechanism about a sliding valve plunger, said deformable member being mounted within the larger portion of the disc retainer opening to rest adjacent the shoulder thereof as said opening is stepped down, said deformable member having a recessed lip sealingly engaging the valve plunger to provide a lesser area of contact with said plunger than the total cross sectional area of said deformable member so that friction forces are minimized between said deformable member and said plunger as they move relative to one another.

7. A control assembly for a brake system having a cylindrical bore and the piston slidably received within said bore;
   a chamber between the depth of said bore and the end of said piston;
   valve means co-axially slidable with said piston and normally preventing a fluid pressure source from entering said chamber; and
   actuating means adapted to move said valve means to control fluid flow from said source to said chamber and to convey feel of operation as well as seal communication of said chamber to return passages of said control assembly, said actuating means being supported by a disc retainer within said assembly having an annular deformable member sealing the assembly of the disc retainer and actuating means with a seal surface for the actuating member of lesser area than a seal surface for the disc retainer such that relative motion between the actuating means and the deformable member is not retarded by friction, said actuating means further having a lost motion connection with said piston so as to move same manually upon the failure of delivery of adequate pressure from said chamber via the discharge port, which connection is such that said actuating means is exposed to the full area of the piston.

8. A control assembly according to claim 7 wherein said deformable member is an annular rubber disc having a stepped central opening to provide a limited area sealing surface within which said actuating means is relatively movable.

9. A control assembly for a brake system having a cylindrical bore and a piston slidably received within said bore;
a chamber which is provided with a discharge port, said chamber being between the depth of said bore and the ends of said piston;
valve means coaxially slidable within said piston and normally preventing a fluid pressure source from entering said chamber; and
actuating means adapted to move said valve means to control fluid flow from said source to said chamber and to convey feel of operation as well as seal communication of said chamber to return passages of said control assembly, said actuating means being supported by a disc retainer within said assembly having an annular deformable member press fitted therein and having a stepped central opening to provide a limited area seal for a valve plunger projecting from the face of the actuating member behind said annular deformable member, said plunger being slidable within said annular deformable member and said actuating member therebehind being slidable within said disc retainer, said actuating means having a lost motion connection wtih said piston so as to move same manually upon the failure of delivery of adequate pressure from said chamber via the discharge port.

10. A control assembly according to claim 9 wherein the sealing lip of limited area of said stepped central opening of said deformable member has a compression fit with said valve plunger which will permit limited relative radial movement as well as sliding movement for said valve plunger.

11. A pressure generating mechanism comprising:
a piston operably arranged in the bore of a housing between a first variable volume chamber and a second variable volume chamber, one of which is provided with a discharge port and the other of which is provided with a return port, which piston has passage means therethrough communicating said first and second variable volume chamber;
a means to control a fluid pressure source including,
a movable member creating a control chamber between said first chamber and said second chamber, which control chamber is open to said passage through said piston and said return port via a tubular valve plunger operably connected to said movable member, which valve plunger is operatively related to a valve poppet arranged between said fluid pressure source and said control chamber; and means to support said movable member in said housing including a deformable reaction member sealing said control chamber about said valve plunger of said movable member; and
means to support said movable member in said housing including,
a deformable reaction member sealing said control chamber about said valve plunger of said movable member, said deformable member having a recess about said plunger leaving a limited area of sliding contact with said plunger to reduce friction forces on said plunger as said movable member moves towards and away from said valve poppet,
a retainer for said deformable reaction member operatively connected to said housing and having a stepped opening therethrough so that said deformable member is press fitted within said stepped opening to abut a shoulder of said opening adjacent the change in diameter of said opening with the smaller diameter of said opening slidably supporting said movable member whereby a proportion area of contact is maintained between said deformable member and said movable member to convey reaction forces of pressure within said control chamber to said movable member and said housing.

12. A pressure generating mechanism according to claim 11 wherein said valve plunger is abuttingly connected to said movable member so as to be radially movable for self-alignment with said valve poppet which radial movement is permitted by the limited area of contact of said deformable member with said valve plunger.

References Cited
UNITED STATES PATENTS 3,188,796  6/1965  French et al. _____ 91—434 XR
3,283,505  11/1966  Julow et al.

MARTIN P. SCHWADRON, Primary Examiner

R. R. BUNEVICH, Assistant Examiner

U.S. Cl. X.R.
60—52; 91—434; 303—52